Figure 1:
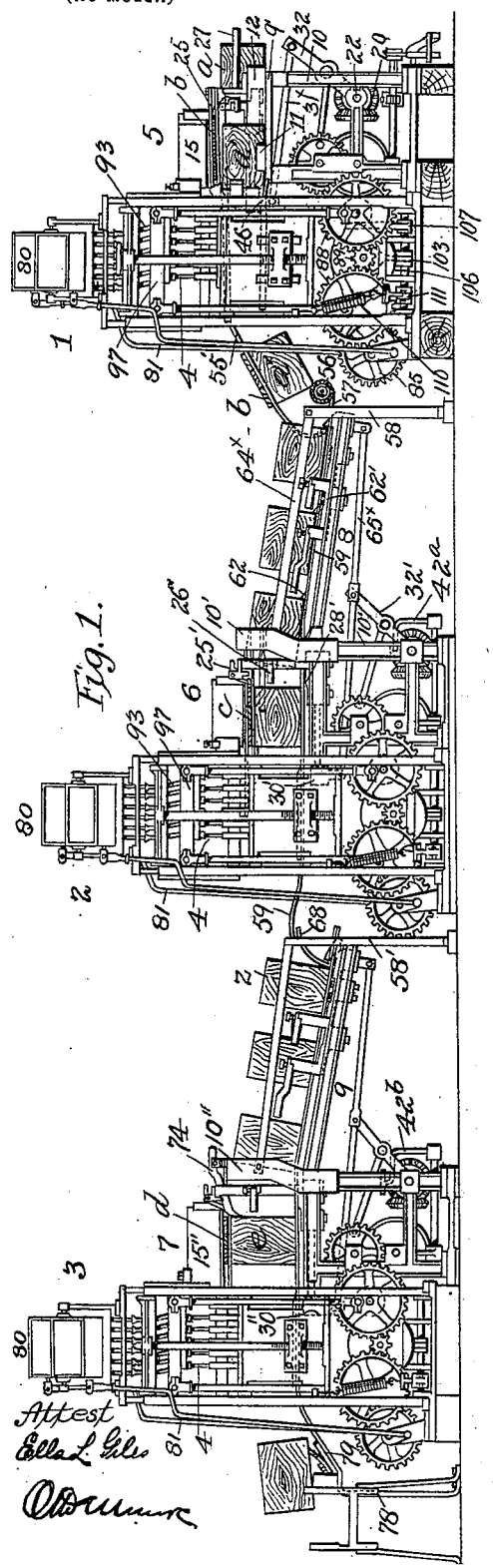

No. 658,844. Patented Oct. 2, 1900.
H. E. HENSCHEL.
MACHINE FOR MAKING BOXES.
(Application filed Mar. 14, 1900.)
(No Model.) 9 Sheets—Sheet 1.

Attest
Ella L. Giles
O. Brunn

Inventor
Henry Edward Henschel
by Richards
Atty.

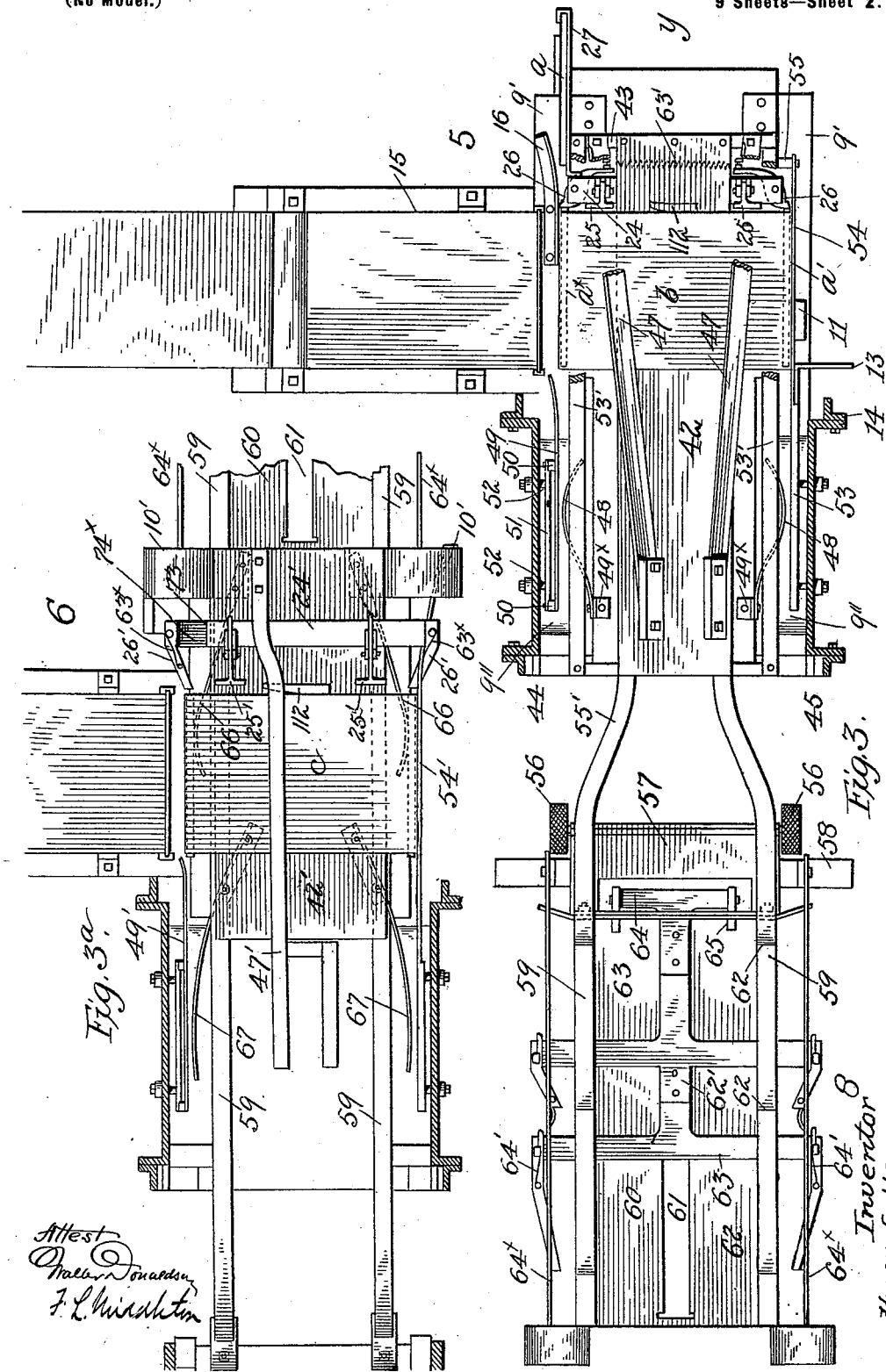

No. 658,844. Patented Oct. 2, 1900.
H. E. HENSCHEL.
MACHINE FOR MAKING BOXES.
(Application filed Mar. 14, 1900.)
(No Model.) 9 Sheets—Sheet 3.
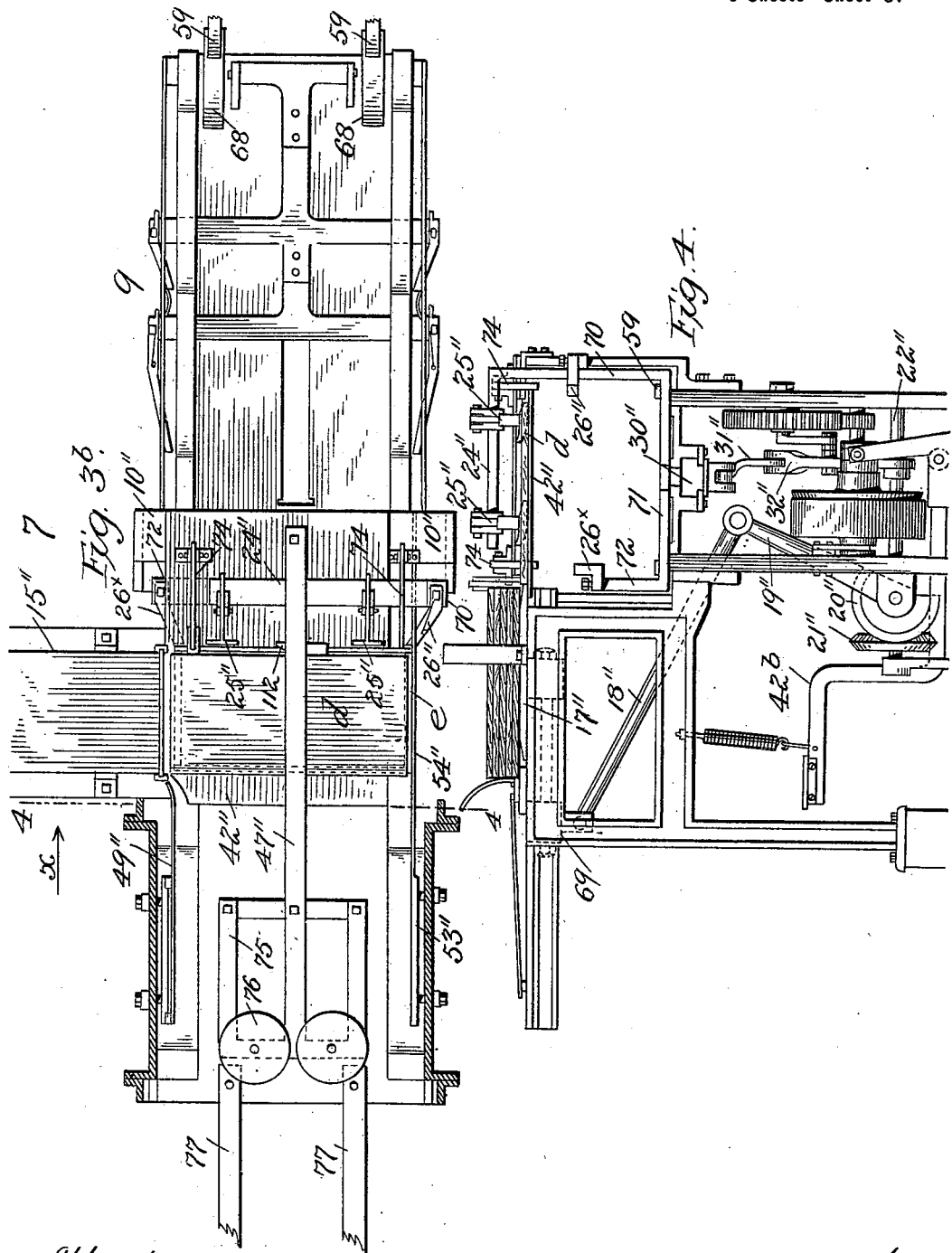
Attest
Ella L. Giles
Inventor
Henry Edward Henschel
by Richardson
Attys.

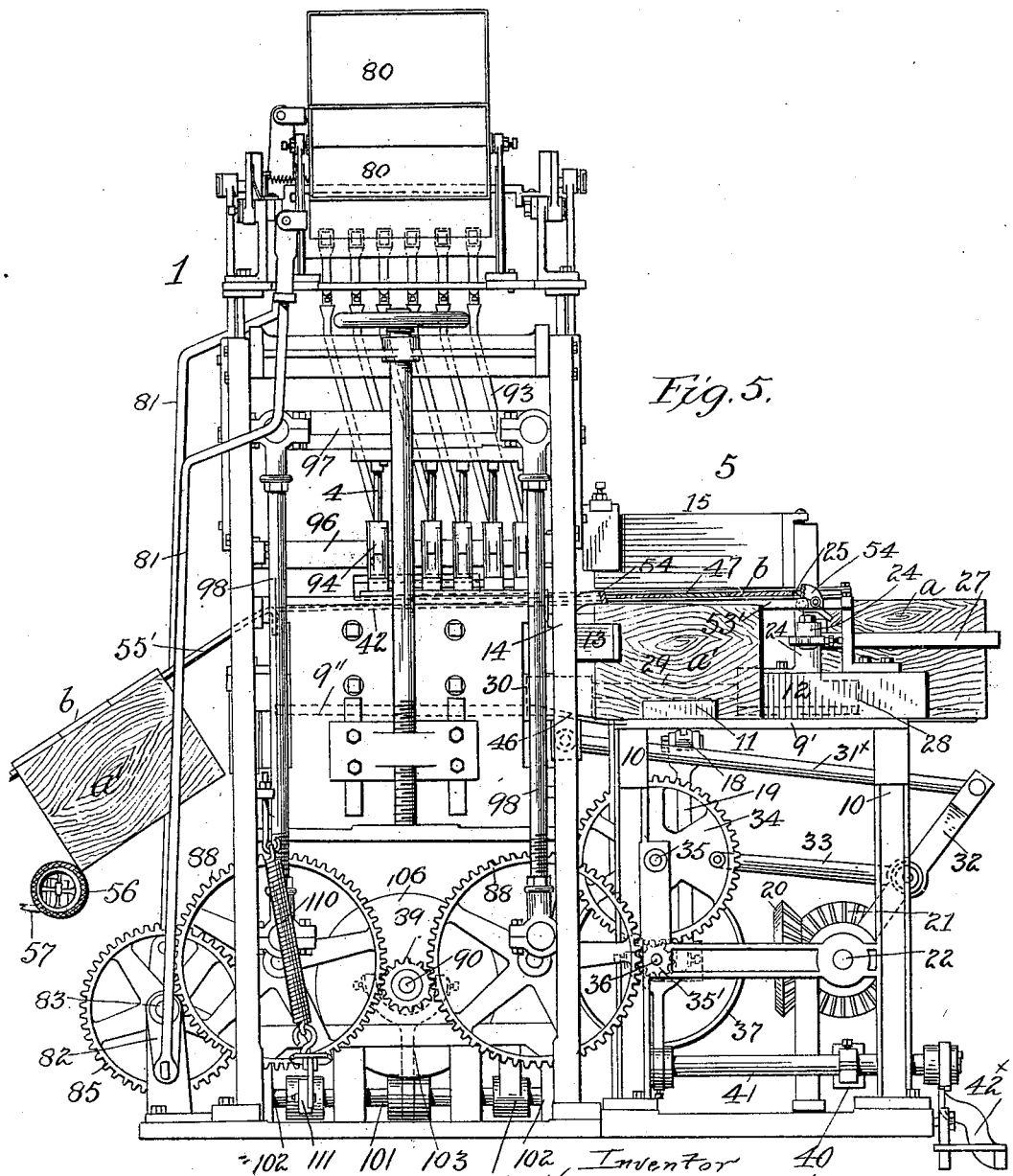

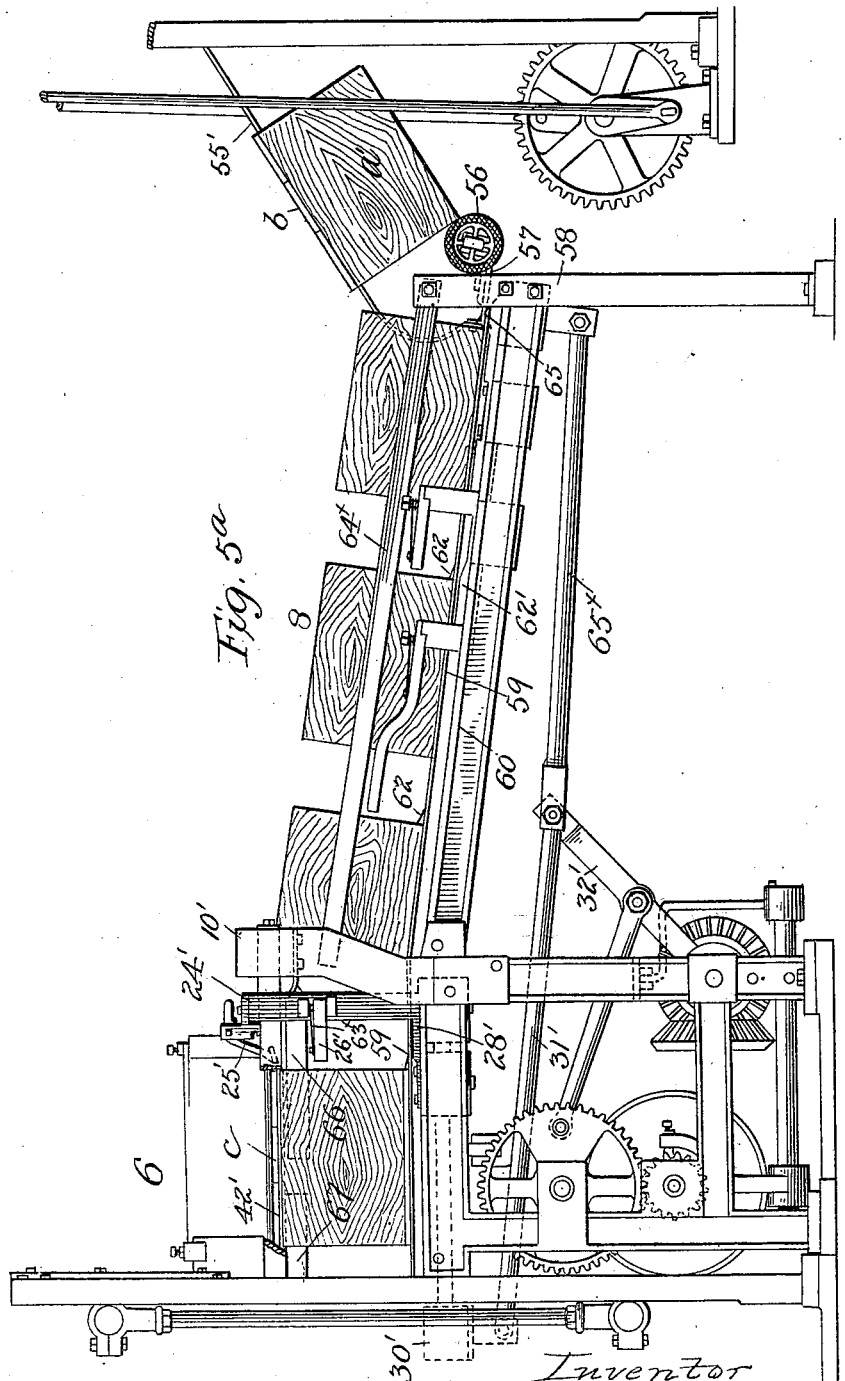

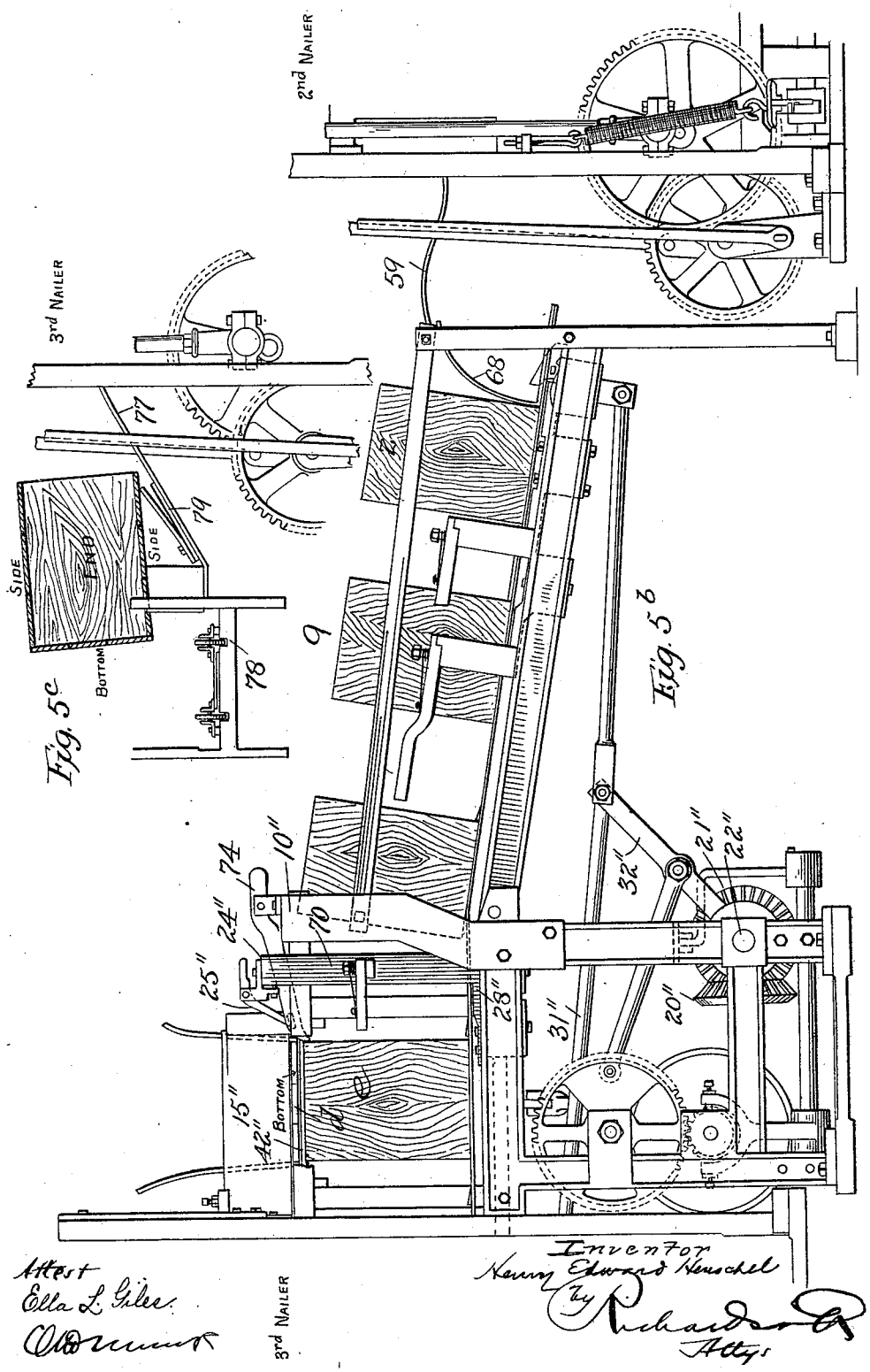

No. 658,844. Patented Oct. 2, 1900.
H. E. HENSCHEL.
MACHINE FOR MAKING BOXES.
(Application filed Mar. 14, 1900.)
(No Model.) 9 Sheets—Sheet 7.
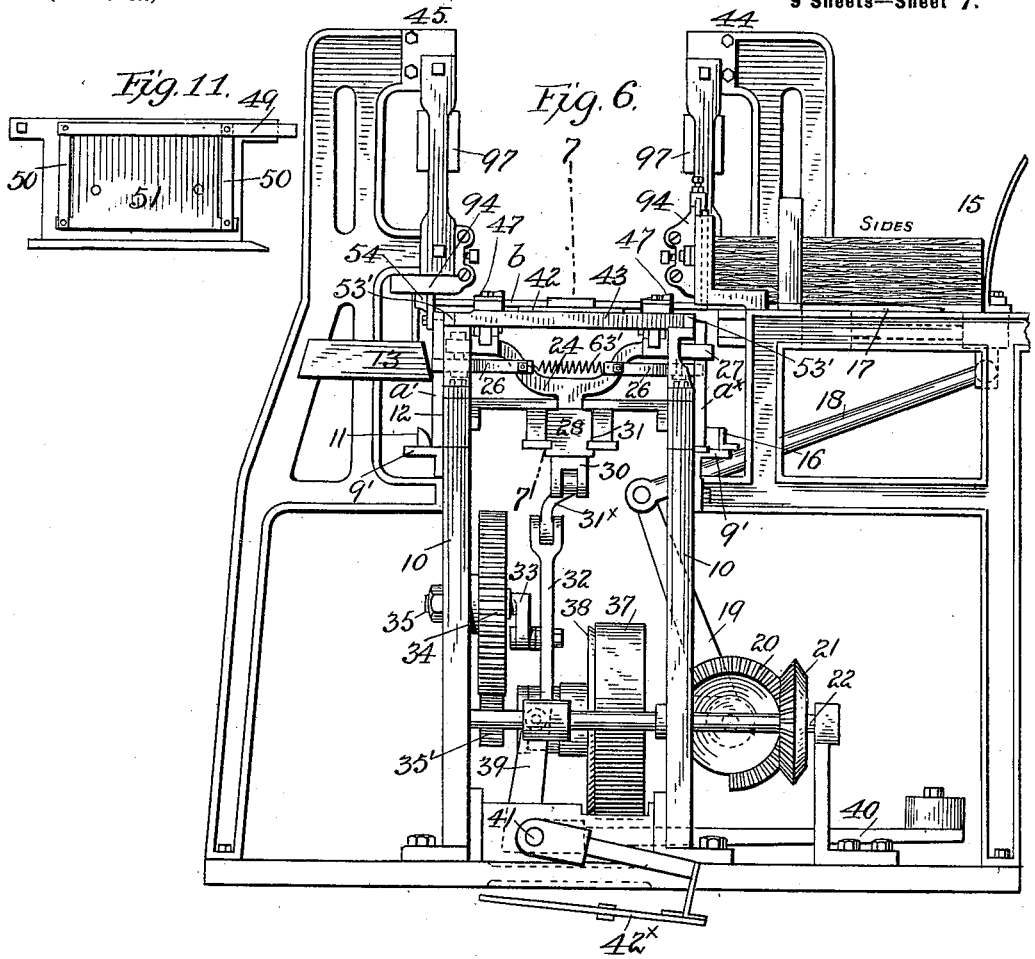
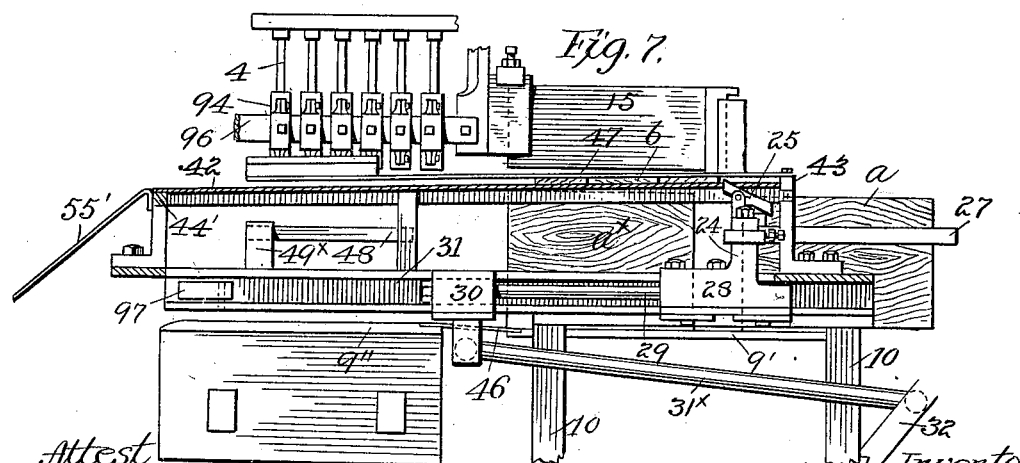

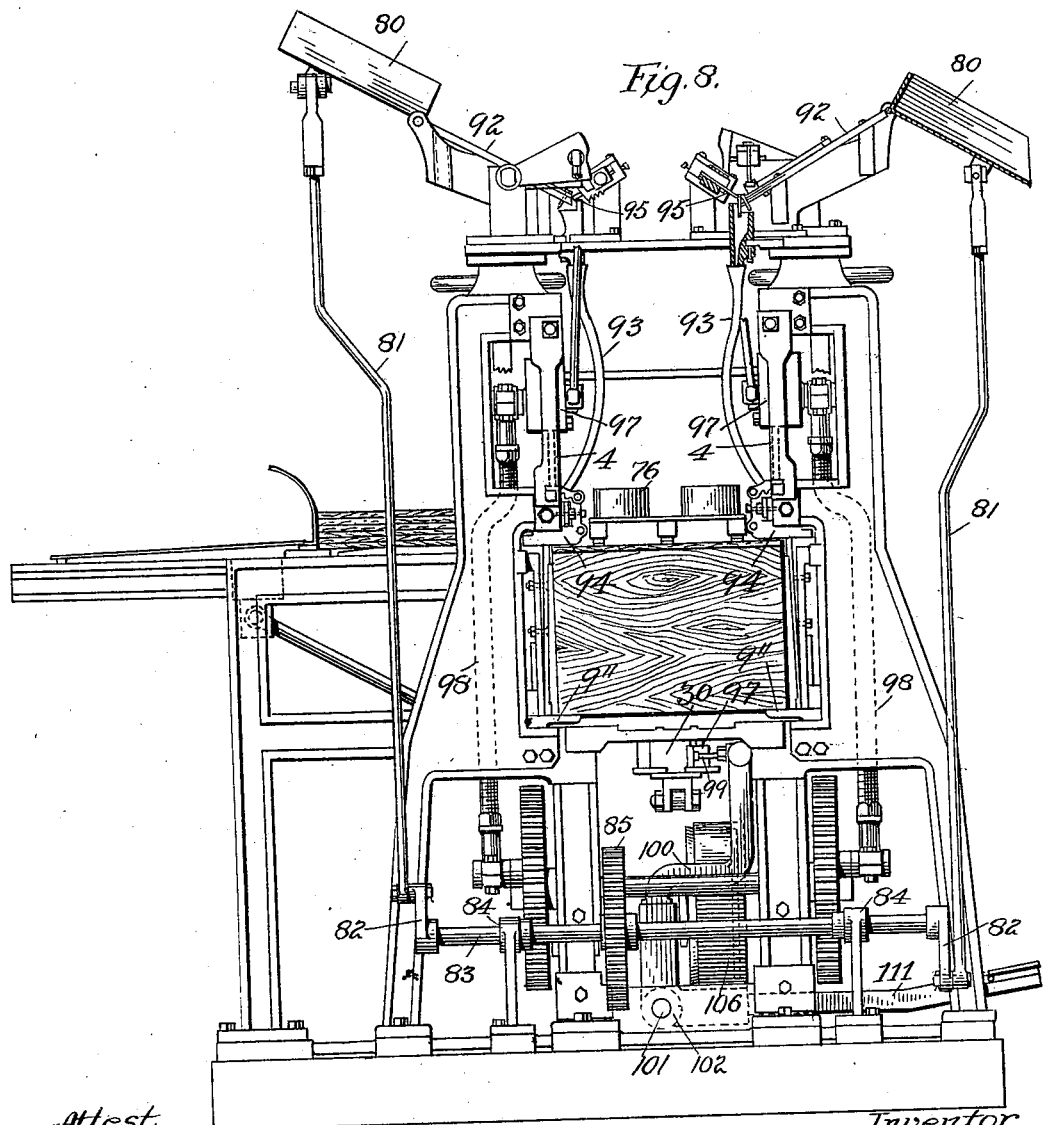

No. 658,844. Patented Oct. 2, 1900.
H. E. HENSCHEL.
MACHINE FOR MAKING BOXES.
(Application filed Mar. 14, 1900.)
(No Model.) 9 Sheets—Sheet 9.
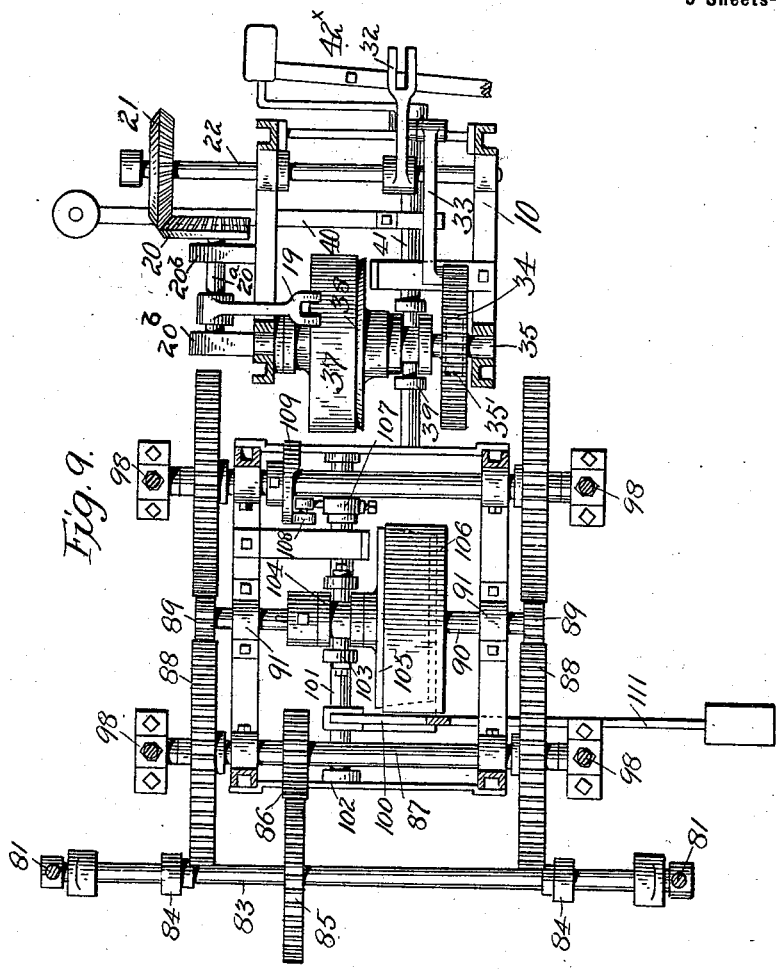

UNITED STATES PATENT OFFICE.

HENRY EDWARD HENSCHEL, OF NEW YORK, N. Y., ASSIGNOR TO THE STANDARD OIL COMPANY OF NEW YORK, OF SAME PLACE.

MACHINE FOR MAKING BOXES.

SPECIFICATION forming part of Letters Patent No. 658,844, dated October 2, 1900.

Application filed March 14, 1900. Serial No. 8,665. (No model.)

*To all whom it may concern:*

Be it known that I, HENRY EDWARD HENSCHEL, a citizen of the United States, and a resident of New York, (Greenpoint,) borough of Brooklyn, State of New York, have invented certain new and useful Improvements in Machines for Making Boxes, of which the following is a specification.

My invention is an improvement in machines for making boxes; and it comprises a plurality of nailing mechanisms each having combined therewith automatic feeding means and automatic conveyers whereby the material or partly-formed box is conveyed from one nailing mechanism to the feed devices of the next nailing mechanism.

In my machine each "nailer" or set of nailing mechanisms, with its feed mechanism, may be controlled independently of the other nailers or nailing mechanisms, so that in case, for any reason, it is necessary to throw out of operation one nailer or set of nailing mechanisms this can be done without interfering with the operation of the other nailers, and thus the whole machine does not have to be shut down when one of the nailing mechanisms is put out of action for adjustment or repairs.

My machine is designed to make up the boxes from previously-formed end, side, and bottom parts, the ends being placed by an attendant in proper position to be fed to the first set of nailing mechanisms, a side being fed automatically in proper position relatively to the two ends and being carried into the nailing-machine by the automatic feed devices. This side having been nailed to the ends, the parts are discharged from the first nailing mechanism onto a conveyer arranged between the first nailing-machine and the second, and in this discharging action the partly-formed box is turned upside down, so that the attached side rests upon the conveyer and the exposed edges of the end parts are uppermost to receive the second side of the box, which is fed automatically by the feed mechanism located in front of the second nailing-machine. The second side having been attached in the second nailing-machine or set of nailing mechanisms, the parts of the box assume the form of an open rectangular case or frame. In discharging from the second machine the case or frame is given a quarter-turn and falls upon a second conveyer, which is arranged between the second nailing-machine or second set of nailing mechanisms and the third nailing-machine, and this conveyer carries the case to the automatic feed device of the third nailing-machine, where the bottom is automatically fed into position over the case or frame, and the parts are then carried into the third nailing-machine, where the bottoms are attached, and the box is then discharged onto any suitable conveyer, which takes it to the point where it is to receive its contents.

I aim to provide for the inspection of the work at the different periods of assembling and nailing the parts, and this I accomplish by providing the conveyers between the different nailing-machines or sets of nailing mechanisms, so that the attendant or attendants can remove from the machine any imperfectly assembled or attached parts as they pass from one nailing-machine to another.

My invention is illustrated in the accompanying drawings, in which—

Figure 2:
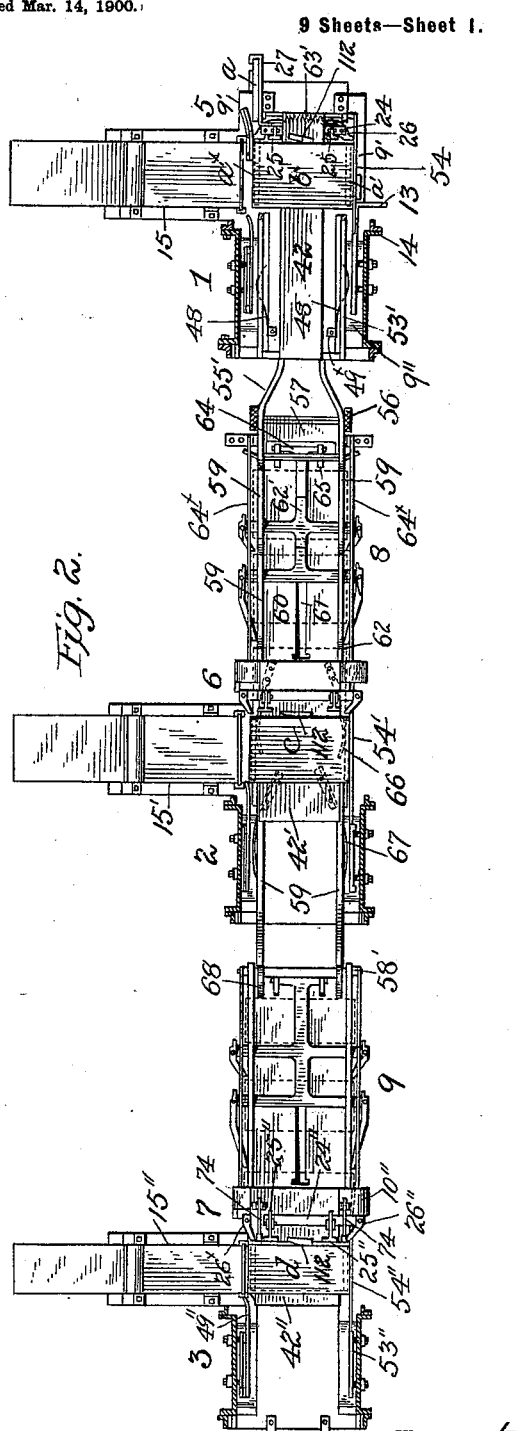

Figure 1 is a side elevation of the entire machine; Fig. 2, a plan view with parts omitted and parts in section. Fig. 3 is a plan view, similar to Fig. 2, of the first nailer and the conveyer between the same and the second nailer. Fig. 3ª is a plan view, similar to Fig. 3, showing the next section of the machine to that shown in Fig. 3 and forming a continuation of said figure. Fig. 3ᵇ is a view, similar to Fig. 3, of the last section of the machine and forming a continuation of Figs. 3ª and 3. Fig. 4 is a view on the line 4 4 of Fig. 3ᵇ looking in the direction of the arrow x. Fig. 5 is a side elevation of the first nailer and its feed mechanism. Fig. 5ª shows a continuation of Fig. 5, being a side elevation of the conveyer between the first and second nailer, showing also the feed mechanism of the second nailer, a portion of the first nailer being shown in this figure also, together with the attached parts of the box, which are being discharged from the first nailer to the conveyer. Fig. 5ᵇ represents in side elevation the conveyer between the second and third nailer and the feed mechanism for the third nailer, so much of the frame of the second and third nailers being shown to illustrate the relation of the parts and to indicate that this figure is a continuation of Fig. 5ᵃ. Fig. 5ᶜ is a side elevation of the discharge from the third nailer. Fig. 6 is a front view of the feed mechanism of the first nailer, a portion of the nailing-machine being also shown. Fig. 7 is a detail view of a section on line 7 7 of Fig. 6, parts being shown in side elevation. Fig. 8 is a rear view of the third nailing-machine with parts in section and parts broken away. Fig. 9 is a plan view of the gearing for driving the nailer and its feed mechanism, with the clutches controlling said parts. Fig. 10 is a sectional view of a detail. Fig. 11 is a view of a detail.

The machine comprises three nailers 1, 2, and 3, each of which may be of any ordinary form, and as the specific construction of these nailers forms no part of my invention I will not describe the same in detail further than is necessary to a complete understanding of my invention. Each of these nailers or nailing-machines comprises two series of nail-drivers 4, one series being arranged to nail the parts of the box at one end thereof, while the other series performs a similar operation at the other end of the box. Combined with each nailer automatic feed mechanism is arranged—such as shown generally at 5, 6, and 7, Fig. 1—and each of these feed mechanisms is adapted to assemble parts of the box and to move these parts under the nail-drivers 4 to be attached to each other, and conveyers 8 and 9 are arranged between the first and second nailers and the second and third nailers, respectively, which are adapted to move the box parts from one nailer to the other.

As shown in Fig. 1, the box parts which are attached to each other by the first nailer are discharged onto the conveyer 8, being given a half-turn in the discharging action, and are conveyed to the assembling and feeding mechanisms of the second nailer, where the second side of the box is positioned, and then these parts are moved into the second nailing-machine, where they are nailed, and are then given a quarter-turn and discharged onto the conveyer 9 to be moved thereby to the assembling and feeding device 7 of the third nailer, which positions the bottom in proper relation to the case and then feeds those parts into the nailer 3 to be nailed together thereby, after which the box is discharged onto any suitable conveyer.

Reverting to the first nailer, the two ends and one side of the box are assembled here and fed automatically into position beneath the nailing devices, and for this purpose tracks or ledges 9' are arranged on each side of the supporting-frame 10, adapted to receive the ends of the box. The attendant places one end on the ledge 9' at the left of the machine, Fig. 6, in upright position, a lug 11 serving to hold the lower edge of the end between itself and the surface 12 of the frame. A projection 13, extending from a part of the first nailer, also serves to hold the end part of the box in position as placed by the attendant. This end part, which is placed in position at the left of the feed mechanism, Figs. 2 and 6, lies in line with a hopper 15, which extends laterally from the feed mechanism of the first nailer, which hopper holds the sides of the box in position to be fed over the end parts, as will be hereinafter described. This end part I have shown at $a'$, (see Figs. 1, 2, 3, 5, and 6,) being shown in some of the figures in dotted lines as lying under the side part $b$ of the box. The second end part, which is to form a part of the same box with the end part shown at $a'$, is indicated at $a^\times$. This lies upon the right-hand ledge 9' and directly opposite the end part $a'$, to which position it has been moved automatically, as will hereinafter be described. The sides are fed into position by means of a slide 17, Fig. 6, reciprocated by a link 18, connected to the slide, a lever 19, a segmental bevel-pinion 20, and a pinion 21 on a shaft 22, which is given a rotary reciprocation, as will be hereinafter pointed out. The segmental bevel-pinion 20 is supported on a pin or shaft $20^a$, journaled in ears or bearings $20^b$ on the frame 10, Fig. 9, and the lever 19 is fixed on this shaft. The bevel-gear 21 meshes with the segmental pinion 20, and through it the lever 19 is reciprocated, it being understood that the shaft 22 has a rocking movement, as will be hereinafter described. The reciprocation of the slide 17 feeds the lowermost side from the pile in the hopper 15 laterally in respect to the nailing-machine and into position over the ends of the box at $a'$ $a^\times$, and then these assembled parts are moved into the nailing-machine by means of a feed-bar 24, which has dogs 25, Figs. 2, 3, and 5, pivoted thereto and arranged to engage the front edge of the side member, while other dogs 26, pivotally connected to the bar 24, engage the end members of the box. The feed-bar 24 has attached thereto a hook 27, which extends forwardly and grasps an end member at $a$ in the position in which it is placed by the attendant, as shown in Fig. 3, and when the feed-bar 24 moves toward the left in Fig. 3 to carry the assembled parts $a'$ $a^\times$ $b$ under the nail-driver, the hook 27 carries the newly-placed end member $a$ into the position shown at $a^\times$ in dotted lines, so that this end member will be in proper position for the next assembling of the parts, which occurs at the next feeding action of the side-feed mechanism and by the placing of an end member on the left-hand ledge 9', Figs. 3 and 6, which, as before stated, is done by the operator.

From the above it will be seen that the operator, standing at the point $y$ in Fig. 3, places the right-hand end member in the position shown at $a$, and when this is drawn into the position shown at $a^\times$ and the attendant has placed the other end member by hand in the position indicated at $a'$ these parts are in proper position to be assembled with the side member, which is fed over them, as hereinbefore described. The operator, it will be understood, places the ends simultaneously in position at the points $a$ and $a'$. A guide 16 is placed on the ledge at the right of the machine, so that the end member will be properly guided from the position $a$ to that shown at $a^\times$, as in Fig. 3.

The feed-bar 24 is carried by a feed-slide 28, which is connected by a rod 29 to a block 30, which is arranged to move in a guideway 31, said block being connected to a link $31^\times$, which is connected to a lever 32, fixed on the shaft 22, before mentioned, said lever 32 being oscillated by a pitman 33, connected to a gear-wheel 34, fixed to a shaft 35, journaled in the frame 10 of the feed mechanism, the said gear being rotated by a pinion 35', Figs. 5 and 6, which pinion is fixed on a shaft 36, journaled in the frame 10, and rotated from a belt-wheel 37 through any suitable form of friction-clutch, such as 38, said clutch being controlled by a clutch-fork 39, which is fixed to a shaft 41, which has a weighted arm 40, through which the clutch is held normally in engagement.

The shaft 41 has connected at its front end any suitable foot-lever $42^\times$, by which the operator may throw out the clutch to stop the feed mechanism, and it will be seen that when this clutch is thrown out both the feed-bar 24 and feed-slide 17 for the sides will be at rest.

I provide a table 42 in the form of a plate extended from a cross-bar 43, Figs. 2, 3, and 6, which bar is fixed to the framework 10 of the feeder. This plate or table extends rearwardly between the sets of nail-drivers or between the opposite sides 44 45 of the nailer and is supported at its rear end at 44', as indicated in Fig. 7. This plate or table serves as a rest or guide for the side member of the box, as shown in Figs. 2, 3, 5, 6, and 7 at $b$. At its front end this table is slightly above the upper edges of the end members at $a^\times$ $a'$, as shown in Figs. 5 and 6, and from this point the table inclines downwardly. In moving toward the rear the end members pass over inclined portions 46 of their supporting ledges or tracks, and the end members are thus slightly raised while the side member moves downward, and when these parts arrive under the nail-drivers 4, Fig. 7, the side member will be resting upon the edges of the end members ready to receive the nails. By reason of this construction the members of the box may be readily fed or assembled in position relative to each other, as shown in Fig. 7, without any danger of conflict between the parts, and it is not necessary that they be accurately positioned when first assembled, for by the arrangement of the incline table for the side member and the incline portions of the track for the end members the parts are brought into engagement, and, further than this, the dogs 25 and 26 engaging the edges of the several members insure their accurate location in respect to each other under the nail-drivers, it being understood, as before stated, that there is a set of nail-drivers on the side 44 of the nailing-machine and another set on the side 45.

The parts of the box when under the nail-drivers rest upon the ledges 9", which are secured to the frame of the nailing-machine and which form continuations of the ledges or tracks before described.

I provide presser-bars 47, secured to the cross-bar 43 and extending rearwardly over the table 42 at a slight distance above the same. These bars overlie the side member of the box and control its rearward movement, exerting a slight pressure thereon sufficient to prevent displacement and to cause the side member to remain in the exact position to which it is moved by the dogs 25 on the feed-bar. For the same purpose in connection with the end members I provide pressure-springs 48, carried by standards $49^\times$ on the frame of the guideway 31, said springs serving to engage the inner faces of the end members and to exercise sufficient pressure thereon to insure accurate positioning of the parts by causing them to rest where left by the dogs 26.

I provide a spring 49, carried by yielding arms 50, Figs. 3 and 11, attached at their lower ends to a plate 51, adjustably supported from the side frame 44 of the nailer by the bolts 52. This spring is in position to bear on the edge of the side member and press the same toward the opposite side of the nailing-machine against the plate 53, and this spring insures a correct lateral position of the side member in relation to the end members. The springs 48 and 49 are curved at their forward ends to receive the box members. The end members in passing to the nailer are guided and controlled by guard-rails 53', which afford bearings for the upper inner faces of said members.

A guard 54, Figs. 3, 5, and 6, is arranged to afford a bearing for the left-hand edge of the side member $b$ when it is first fed into position over the end members, and this guard is supported by a bracket 55, shown in Fig. 3, and connects at its rear end with the plate 53. The two end members and the one side having been moved into position under the nail-drivers are nailed together by the action of the nailing-machine, and after this operation has been performed these attached members are pushed from the first nailing-machine by the next action of the feed mechanism, which causes the newly-fed parts or members to push out the parts that have been nailed. As shown in Figs. 1 and 5, the attached members when discharged from the first nailer move down inclined tracks 55' and the lower portions of the end members strike rollers 56, arranged to turn freely on studs carried by a bracket 57, which is secured to the framework 58 of a conveyer mechanism 8, located between the first and second nailers. By this action the partially-formed box is given a half-turn or tumbles over the rollers 56, so that the attached side $b$ will rest upon track-bars 59, which form continuations of the tracks 55'. The rollers 56 are covered with rubber, and they present different parts of their surfaces to contact with the partially-formed box, and it will be clear that the turning action of the partially-formed box is due to the fact that it receives sufficient momentum in passing down the track 55' to cause it to tumble over when its extreme lower part strikes the rollers.

The conveyer 8 comprises a platform 60, having a guideway 61 therein for a feed-slide 62', said feed-slide comprising arms 63, extending laterally therefrom under the track-bars 59 and terminal arms 64. The arms 64 have dogs 65, which engage the front edge of the side $b$ and push it up the incline tracks 59. The arms 63 also have dogs which are adapted to engage the edges of the end members and which advance them up the incline track. The tracks are provided with detent projections 62, which hold the partially-formed box in the position to which they are moved by the dogs, and it will be seen that by the reciprocation of the feed-slide the attached box members will be moved step by step up the conveyer-tracks, one set of dogs moving the partially-formed box into position to be engaged by the next set of dogs at the next action. The dogs are spring-pressed, and this is also true of the dogs 26 of the first feed mechanism, so that on the retraction of the feed-slide the dogs will yield, so as to pass the box members.

63' indicates a spring for holding the dogs 26 in operative position, and 64' indicates springs which have a like effect upon the dogs attached to the arms 63 of the conveyer. The dogs 25 of the first feeder may be arranged to yield by gravity. Guard-rails $64^\times$, attached to the frame 58 of the conveyer and the frame 10' of the second feeder, serve to guide the partially-formed box in its passage to the second feed mechanism and second nailer.

The conveyer 8 carries the partially-formed box to the feed mechanism (shown generally at 6) of nailer No. 2. This feed mechanism is substantially like that before described, differing only in such details as are rendered necessary by the changed relation of the box parts at this point in the operation. The second side member $c$ of the box is fed into place over the exposed edges of the end members, and the feeder for the side $c$ is similar in all respects to that described for the side $b$, said side $c$ being fed laterally in respect to the machine and over a table or plate 42' and against a guard-rail 54', each part being similar to that described in connection with the first nailer. The feed mechanism for the loosely-assembled parts differs somewhat from that described in connection with the first nailer; but this difference will be pointed out fully in connection with the feed mechanism of the third nailer, which is substantially like that of the second nailer. The side $c$ is engaged by dogs 25', while the edges of the end members are engaged by dogs 26', the former being arranged to yield by gravity and the latter being provided with springs $63^\times$, which allow them to yield in passing the parts of the next box on their return stroke. These dogs are carried by a feed-bar 24', which is connected with a feed-slide 28' and which is operated through a reciprocating block 30', link 31', and lever 32' in a manner similar to that described in connection with the feed mechanism of the first nailer. A second link $65^\times$ connects the lever 32' with the feed-slid 62' of the conveyer and serves to operate the same. The track-bars 59 are continued through the second nailer, as shown in Figs. 1, 2, and $3^a$, and upon these the box parts are supported and moved. Spring-arms 66, connected with the frame 10', Fig. $3^a$, press upon the inner faces of the end members and hold them in proper position at the feed mechanism of the second nailer, and a second pair of spring-arms 67 perform a like function when the parts of the box are under the nail-drivers of the second nailer. These springs 67 are secured to the under side of the table 42'. The presser-bar 47' is used in connection with the second nailer and its feed mechanism to act on the side $c$ in a manner similar to that before described in connection with the first nailer. The act of assembling the parts by the lowering of the side $c$ and the raising of the end members with the attached side $b$ is similar to that already described and need not be specifically described again. A spring 49' performs a function similar to that described in connection with spring-arm 49, before referred to. After the second side $c$ is attached the box parts, which are now in the form of an open rectangular frame, are moved rearwardly by the feeding in of the next box parts over curved terminals of the track-bars 59, and the frame upon leaving these terminals moves down curved guard-bars 68, and in doing so makes a quarter-turn, as shown at $z$ in Fig. 1. The guard 68 is supported upon a frame 58' of the conveyer 9 between the second and third nailer. This conveyer is the same in substance as the conveyer 8, before described, and by its action the box-frames are moved step by step to the feed mechanism 7 of nailer No. 3. Here the bottom $d$ of the box is fed from a supply-hopper 15'' in a direction laterally of the whole machine over a table 42'' and over a box-frame, as shown in position at $e$ in Figs. 1 and $3^b$.

The feed mechanism for the bottoms $d$ is similar in all respects to that described in connection with the first feed and consists of the slide 17'', Fig. 4, which is operated through a sliding block 69, a link 18'', an arm 19'', gearing 20'' 21'', and shaft 22'', to which a rotary reciprocation is given by the lever 32'' in a manner similar to that described in connection with the first feeder. The feed mechanism for the box-frame comprises a feed-bar 24″, which is connected with a block 28″ by a vertical portion 70 and a horizontal portion 71. Block 28″ is operated by a block 30″ and pitman 31,″ connected with the lever 32″, before described. The feed-bar 24″ carries gravity-dogs 25″, which engage the front edge of the bottom member, and a spring-dog 26″ is pivotally connected to the vertical portion 70 of the feed-bar, while a second feed dog 26$^\times$ is connected to a vertical extension 72 of the lower bar 71 of the feeding device.

It will be noticed that there is a space left between the upper end of the extension 72 and the end of the upper bar 24″ of the feed device, and this space is provided, as shown in Fig. 4, in order to enable the bottoms to be fed into place no matter at what point in the stroke the feed device may be. Were the feed device made up of a complete rectangular frame, it would have to be returned all the way to its forward position of rest before the next bottom member could be fed into place over the table 42″; but with the arrangement shown, in which a space is provided, the bottom may be fed laterally through this space as the feed device is being returned to its forward position. This feature is common also to the feed mechanism of nailer No. 2, the end of the bar 24′ being shown at 73, and 74$^\times$ indicates the lower bar of the feed device. (See Fig. 3$^a$.)

It will be noticed that the feed mechanisms of the second and third nailers must differ from that of the first nailer, because at the second and third nailers we are dealing with a partially-formed box, while at the first nailer we are dealing with unattached parts. At the first nailer the dogs 26 in returning to forward position can move along the inner faces of the end members, which have been newly placed into position shown at $a'$ $a^\times$, and therefore the feed-bar 24 can occupy a position between the end parts of the box, and the dogs 26, pivoted to said feed-bar, can reach outwardly to engage said end parts. This arrangement is possible because there is no side member attached to the end members so as to reach across from one end member to the other and obstruct the space between. This condition is present, however, at the second nailer, where the parts have assumed the form of a U-shaped frame, and for this reason the portions 71 of the feed device extend outwardly from its connection with the block 30′ or 30″, Fig. 4, under the tracks 59, and the extensions 70 72 reach upwardly outside of the partly-formed box, from which extensions the pivoted dogs extend inwardly to engage the box-frame. Detents 74 are pivoted to the frame 10″ of the third nailer and serve to prevent the displacement of the box-frame. At the third nailer the guard-rail 54′ is used in connection with the adjustable plate 53″, and the spring-arm 49″ is also used to insure the accurate positioning of the bottom when under the nailing mechanism. The spring-arms, such as 66 and 67 and 48, used in connection with the first and second nailers are not present in the third nailer, as they could not be used, owing to the parts having assumed the form of a frame, and they are not necessary in this connection. The presser device for pressing upon the bottoms as they are fed rearwardly is shown at 47″, this being in the form of a framework 75, carrying weights 76. From the third nailer the box, which is now complete, with the exception of its lid, is discharged down tracks 77 onto any suitable conveyer, the frame of which is indicated generally at 78 in Fig. 1. In passing down the ways or tracks 77 the box at its lower end strikes the obstruction 79 and tips over onto the conveyer, making a half-turn, so that its open side is uppermost.

As before stated, the nailing-machines may be of any suitable type, and it is thought only necessary to point out the essential features of the machine illustrated, and for this purpose reference is had to Figs. 5, 8, and 9, in which the nail-holding pans are shown at 80 pivotally supported and rocked by rods 81 from cranks 82 on the ends of a shaft 83, journaled in bearings 84 of the framework, which shaft is driven through gearing 85 86 from the shaft 87, which shaft is journaled in the framework and carries gears 88, meshing with pinions 89 on a main driving-shaft 90, journaled in the frame at 91. The rocking movement of the nail-pan causes the nails to be fed, as is well known in this art, down the tracks 92, and thence to the nail-tubes 93 and nail-boxes 94, suitable cut-off mechanism arranged to feed one nail at a time being located at 95. The nail-boxes are supported on a cross-bar 96. The nail-drivers 4 extend down into the nail-boxes and are carried by a crosshead 97, one on each side of the machine, which are suitably guided in the frame and are reciprocated by pitmen 98, connected therewith and with crank-pins carried by the gears 88.

The action of each nailing mechanism is controlled by the feed mechanism of the nailer, and for this purpose I provide at the rear of the guideway 31 a pivoted block 97, Figs. 7, 8, and 10, which is struck by a roller 98$^a$, carried by the block 30 of the feed mechanism, so that the said block 97 is pushed aside to strike against the adjustable projection 99 on a lever 100, which is fixed to a shaft 101, journaled in a framework at 102, said shaft having thereon a clutch-fork 103, which connects with the grooved collar 104 of the clutch member 105. The other member of said clutch comprises a belt-wheel 106, arranged to run loosely on the shaft 90, while the clutch-collar is splined thereto in a well-known manner. When the feed-block 30, 30′, or 30″ arrives at the limit of its stroke and has placed the parts to be nailed in proper position under the nailing mechanism, the friction-clutch 105 106 is thrown into engagement by the operation of the block 97 and lever 100, and the nailing devices are thus set in action, because of the rotation of the pinions 89 and the gearing 88, 85, and 86. The nailing mechanism when once set in operation is held operative for a complete revolution of the gears 88, and consequently for a complete reciprocation of the nail-drivers, and for this purpose the shaft 101 is provided with an arm 107, fixed thereto and carrying a roller 108, bearing upon a cam 109, the high part of which holds the clutch in engagement and until the low part of the cam comes opposite the roller, when the spring 110, Fig. 5, connected with the arm 111 of the lever 100, will operate said lever to throw out the clutch, and the nailing mechanism will then remain inactive until the next set of box parts are fed into position under the nail-drivers.

The side parts of the box are guided to proper position when fed by guide blocks or ribs 112, located on the tables 42 42' 42".

As before pointed out, the mechanism of the several nailers is alike and the mechanism of each of the feeders is alike in all essential particulars.

Each feeding mechanism 5 6 7 may be controlled separately, and when either is thrown out of operation the nailing mechanism which it feeds will remain out of operation.

For the purpose of controlling the feeding mechanisms they are each provided with a foot-lever, that for the first feeder 5 being indicated at 42$^\times$ and arranged to control the clutch 37 38, Fig. 9, that for the second feeder being indicated at 42$^a$ and controlling clutch mechanism similar in all respects to that shown at 37 38, and the foot-lever for the third feed mechanism being indicated at 42$^b$. It will be seen that the attendant at either feed mechanism can throw out of operation the said mechanism and the nailing mechanisms which coöperate therewith, and during this time the other portions of the machine can continue running, and thus the output of the machine is not entirely stopped. During the time that nailer No. 2 is shut down an attendant can remove the partially-formed boxes from the conveyer 8 and pile them up at one side of the machine in convenient position to be placed back upon the conveyer, and this replacing upon the conveyer of the excess from the first nailer may take place at any time that the latter may be out of operation. It will be noticed also that the conveyer mechanism of each of the second and third nailers is driven from the driving mechanism which operates the feed devices, and thus, for instance, when the second nailer is out of operation its conveyer also stops.

The conveyers are arranged in an inclined plane, and their lower ends are below the tracks of the nailing-machines, so that as the work is discharged from the nailing-machines it may fall by gravity onto said conveyer, and in this falling movement it may be given the half or quarter turn described. The upper end of the conveyer is in the same horizontal plane with the tracks upon which the work moves in passing through the nailing mechanisms. The method of conveying the partially-formed boxes from one nailing mechanism to another enables the attendants to inspect the work as it progresses, and any imperfect parts can be removed.

The sides or other parts of the box may be made up of pieces. In feeding the end parts of the box in position (see Fig. 6) they are placed by the attendant against the outer side of the framework 10, and the feed-dogs operate between the end parts and reach out to engage them.

The conveyers 8 and 9 run at a little higher speed than the feeding mechanism 5 to permit of replacing from time to time without stopping the first feeder any partly-formed boxes that may have been taken out.

I claim—

1. In combination, a plurality of nailing mechanisms, and inclined conveyers between the same with means for operating the parts, the low end of each conveyer being at the discharge side of the nailing mechanism from which point it rises to the feed side of the next following nailing-machine, substantially as described.

2. In combination, a nailing mechanism for attaching the first side and ends, a nailing mechanism for attaching the second side to the ends, a nailing mechanism for attaching the bottom of the box, means operating in con connection with each nailing-machine for placing the parts in position to be nailed, and means operating in connection with the nailing mechanism for moving the two sides and the bottom of the box laterally of the machine, to assemble the same with the other parts of the box, there being one of the said laterally-feeding means at each nailing mechanism, and the hoppers of all the feeding means being located to one side of the machine and of the course of the work through the apparatus, substantially as described.

3. In combination, in a box-machine, nailing mechanisms, and a feeder for each of the sides and the bottom of the box, each feeder comprising a hopper and a feed-slide, said feeders operating transversely of the machine to feed the sides and bottoms laterally in respect thereto with means for operating the said parts all the said hoppers being located to one side of the machine and of the course of the work, substantially as described.

4. In combination in a nailing-machine, a nailing mechanism for attaching parts of the box, means for giving the partially-formed box a half-turn after leaving the said nailing mechanism, a second nailing mechanism, means for feeding the work to the second nailing-machine in its inverted position, means for giving the box-frame a quarter-turn after leaving the second nailing mechanism, a third nailing mechanism and means for feeding the work to the third nailing-machine, substantially as described.

5. In combination, three nailing mechanisms, means for assembling box parts at said mechanisms, said means comprising a feeder for moving the box parts into place, and means for feeding the assembled parts of the box to the nailing mechanisms, means for turning the work between the nailing mechanisms, and conveyers for carrying the work from one nailing mechanism to the next, the feed mechanism for the second and third nailing mechanisms being located between the conveyers and the said mechanism and each including a laterally-disposed hopper for the parts, substantially as described.

6. In combination, three nailing mechanisms, means for assembling box parts at said mechanisms, said means comprising a feeder for moving the box parts into place, means for feeding the assembled parts of the box to the nailing mechanisms, and conveyers for carrying the work from one nailing mechanism to the next, said conveyers being inclined, substantially as described.

7. In combination, in a box-nailing machine, a nailing mechanism, means for partially turning the work as it moves by gravity therefrom, a second nailing-machine, and means for raising the work after being turned and for feeding it thereto, substantially as described.

8. In combination, nailing mechanism, a frame having tracks or rests for the end parts of the box, said frame having also bearings for the inner faces of the end parts, means to engage and hold the end parts against said bearings, a hopper located to one side of the machine, and means for feeding the box side part over the end parts, substantially as described.

9. In combination, a nailing-machine, a frame having the tracks 9' and the bearing-surfaces as 12 against which the inner faces of the box parts may rest, and a feed device moving in line with the spaces between the box parts and having outwardly-reaching dogs engaging the forward edges of the unattached end parts, substantially as described.

10. In combination, the nailing mechanism, the frame having the tracks 9' and the bearing-surfaces for the end parts of the box, the feed-slide having the outwardly-reaching dog, the dogs for feeding the box side with means for feeding the side over the end parts, substantially as described.

11. In combination, the nailing mechanism, the frame having the rests for the end parts, a laterally-disposed feeding device for the box sides to feed the same over the end parts, means for feeding the assembled parts to the nailing mechanism and means for feeding one of the end parts of the box to its assembling position in a direction longitudinally of the machine, substantially as described.

12. In combination, the nailing mechanism, the frame having the rests for the box parts, a laterally-disposed feeding device for the box sides, means for feeding the assembled parts to the nailing mechanism and means for feeding one of the end parts of the box to its assembling position, said means comprising a hook 27 attached to the feeder for the assembled parts, substantially as described.

13. In combination, the nailing mechanism, a laterally-disposed feeding device, a guard-rail in line with the edges of the box parts for limiting the movement of the parts as fed by the said device, means coöperating with said feeder and guard for assembling the parts and means for feeding the assembled parts to the nailing mechanism, substantially as described.

14. In combination, nailing mechanism, a feed device for feeding the assembled parts thereto, means for supporting part of the box to be acted on by the feed device and a table to hold another part of the box to be acted on by the feeder, said feeder engaging the box part on the table directly and moving the same positively thereover, substantially as described.

15. In combination, a nailing mechanism, a feeder for the parts of the box, and a table for one of the box parts along which it is fed, said table being inclined whereby the box parts will be assembled loosely and will be brought together when fed to the nailing mechanisms, substantially as described.

16. In combination, a nailing-machine, a feeder and supporting means for the box parts, said supporting means presenting a bearing-surface in advance of the nailing mechanism to hold the parts of the box separated while moving to the nailing mechanism, substantially as described.

17. In combination, a nailing mechanism, a feeder, supporting means for one part of the box upon which it is placed to be assembled with the other parts, and the tracks having inclined portions to make the parts of the box approach each other, substantially as described.

18. In combination in a box-nailing machine, a nailing mechanism, feed mechanism for the assembled parts, the inclined table, and the tracks having the inclines, substantially as described.

19. In combination, in a box-nailing machine, the tracks 9', the guard-rails 53, the lugs 11 and the projection 13 and feed mechanisms, substantially as described.

20. In combination, the nailing mechanism, a feed device for the assembled parts, a support along which one of the parts moves and means for pressing the box part on said support, substantially as described.

21. In combination, a nailing mechanism, the inclined tracks 55' leading therefrom, the rollers 56 arranged to be struck by the depending portions of the partly-formed box, a second nailing mechanism and means for carrying the partly-formed box from the rollers to the second nailer, substantially as described.

22. In combination, a nailing mechanism, a feeder therefor comprising a reciprocating slide, a lever 32 for operating said slide having connection therewith, a feeder operating transversely of the machine and comprising a slide, a shaft 22 which is rocked by the lever 32, the bevel-gearing and the lever operated thereby and connected with the transverse slide substantially as described.

23. In combination, a nailing mechanism, an inclined conveyer leading therefrom having tracks with detent projections a feed-slide operating below the said tracks and having dogs to engage the work, and a second nailing mechanism to receive the work from the conveyer, substantially as described.

24. In combination, a conveyer comprising a reciprocating slide, a nailing mechanism, a feed mechanism for the nailing mechanism comprising a feed-slide, a lever a link connected with the lever and connected with the feed-slide for operating the same and a link connection $65^\times$ from said lever to the slide of the conveyer, substantially as described.

25. In combination, a nailing mechanism, a second nailing mechanism, and means for transferring the partly-formed material from the first nailing mechanism to the second, said means comprising dog carriers arranged outside the path of the material and dogs reaching inwardly therefrom, substantially as described.

26. In combination with a nailing mechanism, means for feeding thereto unattached parts, said means comprising a carrier with dogs reaching outwardly therefrom to engage the said parts, a second nailing mechanism and means for feeding thereto the parts which are attached by the first nailing mechanism, said means comprising a carrier with dogs reaching inwardly therefrom, substantially as described.

27. In combination, a nailing mechanism, tracks leading thereto upon which the material moves, and a feed-slide having upwardly-extending arms outside of the plane of the box parts, said arms having dogs carried thereby extending inwardly, substantially as described.

28. In combination with the nailing mechanism, a feed mechanism comprising a feed-slide with arms or bars attached thereto in the form of an open frame through which the box parts may pass, the dogs reaching inwardly from said arms or bars to engage the box parts, means for feeding parts of the box from one side of the machine, the said frame being left open at one side to permit the lateral feeding of the box parts, substantially as described.

29. In combination, a nailing mechanism, a feed-slide, the arms extending laterally therefrom, the upwardly-extending arms, the dogs carried thereby, and the upper cross-bar carrying dogs, substantially as described.

30. In combination, a nailing mechanism, means for feeding the material thereto, springs 48 for pressing upon the parts of the material and guiding and bearing surfaces for the material opposite the springs, to and from which the material is moved by the feeding means, substantially as described.

31. In combination, a nailing mechanism, tracks or supporting means for the partially-formed box of U shape, feeding means and spring-arms supported out of the way of the lower cross-piece of the box and arranged to engage the inner faces of the material, substantially as described.

32. In combination, a nailing mechanism and a conveyer with the guard 68 and the track portion said guard extending from the nailing mechanism downwardly to the conveyer, substantially as described.

33. A nailing-machine comprising a plurality of nailing mechanisms with means for carrying the partly-formed box from one nailing mechanism to another, each nailing mechanism being independently controlled to be thrown into and out of operation with means for so controlling the nailing mechanisms, substantially as described.

34. In combination, a nailing-machine comprising a plurality of nailing mechanisms, a feed mechanism for each nailing mechanism, conveying or transferring means, means for operating and controlling each feed mechanism independently of the other feed mechanism or mechanisms, and devices actuated by the feed mechanisms of each nailing mechanism whereby the latter is placed in operation each time a feeding action takes place, substantially as described.

35. A nailing-machine comprising independently operated and controlled nailing mechanisms, means for controlling the said mechanisms to throw either out of operation alone and transferring or conveying means between the nailing mechanisms arranged to permit the ready removal or replacing of the material, substantially as described.

36. In combination, a plurality of nailing mechanisms means whereby each nailing mechanism is independently operated and controlled to be thrown into and out of operation and a conveying mechanism with means whereby it is controlled by and operates with the nailing mechanism to which it is intended to carry the material, substantially as described.

37. In combination, a plurality of nailing mechanisms, and conveyer mechanism between the same and extending permanently from one nailing mechanism to the other to receive the material at one end and discharge it at the other, said conveyer mechanism being independent of the nailing mechanism and being of a length to hold a plurality of partly-formed boxes, and being open for the removal or replacing of the boxes, substantially as described.

38. In combination, a plurality of nailing mechanisms, conveyer mechanism between the same, said conveyer mechanism having a step-by-step action and being of a length to hold a plurality of partly-formed boxes, and being open for the removal or replacing of the boxes and means for moving the conveyer step by step, substantially as described.

39. In combination, a plurality of nailing mechanisms, means for operating and controlling each nailing mechanism independently of the other mechanisms, means for giving the material a partial turn in its passage from one nailing mechanism to the next, conveying means permanently arranged between and extending from one nailing mechanism to the other with means for operating the same in proper time relative to the nailing actions to form a complete machine, substantially as described.

40. In combination, a plurality of nailing mechanisms each one of which is constructed to nail at both ends of the box, means for operating and controlling each nailing mechanism independently whereby any nailing mechanism may be put out of operation and means for transferring the material from one nailing mechanism to the next, said transferring means extending permanently from one nailing mechanism to the other and being automatically timed in its operations with respect to the nailing actions, substantially as described.

In witness whereof I have hereunto set my hand in presence of two witnesses.

HENRY EDWARD HENSCHEL.

Witnesses:
WILLIAM BROWN EMMONS,
HUGO LOUIS BEIL.